April 15, 1969     C. J. MELECH     3,438,697
WIDE-ANGLE TRIPLET OBJECTIVE
Filed Jan. 23, 1967
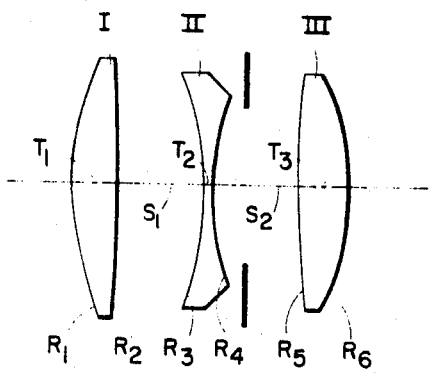
CHARLES J. MELECH
INVENTOR.
BY
ATTORNEYS

United States Patent Office 3,438,697
Patented Apr. 15, 1969

3,438,697
WIDE-ANGLE TRIPLET OBJECTIVE
Charles J. Melech, Rochester, N.Y., assignor to Eastman Kodak Company, Rochester, N.Y., a corporation of New Jersey
Filed Jan. 23, 1967, Ser. No. 611,115
Int. Cl. G02b 9/14
U.S. Cl. 350—226
7 Claims

ABSTRACT OF THE DISCLOSURE

A photographic objective is disclosed which is of the simple triplet type. The objective has a field angle of at least 53°, is well corrected for spherical and chromatic aberrations, coma, astigmatism, flatness of field and is compensated for temperature variations. Seven embodiments are disclosed.

---

This invention relates to improvements in photographic objectives of the simple triplet type having a large field angle.

An object of this invention is to provide an improved simple triplet type of photographic objective having a field angle of at least 53°, and which is well corrected for spherical and chromatic aberrations, coma, astigmatism, flatness of field, and is compensated for temperature variations.

Further objects and advantages will be found in the details of construction disclosed in the accompanying examples and drawing.

The present invention comprises triplet objectives having two outer positive biconvex elements and an inner negative biconcave element. The inner surfaces of the positive elements facing the negative element have less curvature than any of the other lens surfaces.

Glass or plastic lens elements may be used in the practice of this invention, but plastic is generally preferred because of low cost and manufacturing simplicity. The use and advantage of plastic elements in triplets is discussed in U.S. Patent 3,194,116 which discloses triplet objectives having the negative element formed from a copolymer of acrylonitrile and styrene having an index of refraction $N_D$ about 1.56 and an index of dispersion V about 37. To compensate for temperature changes, one of the positive elements is formed from a plastic material having different expansion and optical characteristics than the negative element. Preferably, the positive elements are formed from methylmethacrylate, with an index of refraction $N_D$ about 1.49 and an index of dispersion about 57.

The drawing shows a cross sectional view of an objective embodying the invention with the long conjugate on the left.

The objective in the drawing comprises three airspaced simple lenses, designated I, II and III. The outer two lenses I and III are positive biconvex elements, and the inner lens II is a negative biconcave element. The diaphragm is located between lenses II and III. Numerical data for constructing seven embodiments of photographic objectives according to the invention as outlined above is given in the following examples in which the lense elements are numbered from front to rear, N is the index of refraction of the lens elements for the D line, V is the index of dispersion, and R, T and S refer respectively to the radii of curvature of the lens surfaces, the thicknesses of the lens elements and the airspaces between the elements, numbered by subscript from front to rear.

EXAMPLE 1

Equivalent Focal Length=100 mm.   f/5.6

| Lens | $N_D$ | V | Radii (mm.) | Thicknesses and Spacings (mm.) |
|---|---|---|---|---|
| I | 1.49 | 57.4 | $R_1=28.7$ | $T_1=8.58$ |
|   |      |      | $R_2=-199$ | $S_1=4.65$ |
| II | 1.57 | 36.6 | $R_3=-49.5$ | $T_2=2.44$ |
| Stop |   |   | $R_4=29.6$ | $S_2=3.13, 4.97$ |
| III | 1.57 | 57.4 | $R_5=111$ | $T_3=5.74$ |
|   |   |   | $R_6=-44.5$ |   |

EXAMPLE 2

Equivalent Focal Length=100 mm.   f/6.3

| Lens | $N_D$ | V | Radii (mm.) | Thicknesses and Spacings (mm.) |
|---|---|---|---|---|
| I | 1.49 | 57.4 | $R_1=28.6$ | $T_1=8.56$ |
|   |      |      | $R_2=-198$ | $S_1=4.63$ |
| II | 1.57 | 36.6 | $R_3=-49.4$ | $T_2=2.43$ |
| Stop |   |   | $R_4=29.5$ | $S_2=3.12, 4.38$ |
| III | 1.49 | 57.4 | $R_5=89.4$ | $T_3=6.24$ |
|   |   |   | $R_6=-38.9$ |   |

EXAMPLE 3

Equivalent Focal Length=100 mm.   f/6.3

| Lens | $N_D$ | V | Radii (mm.) | Thicknesses and Spacings (mm.) |
|---|---|---|---|---|
| I | 1.49 | 57.4 | $R_1=28.5$ | $T_1=9.42$ |
|   |      |      | $R_2=-197$ | $S_1=4.17$ |
| II | 1.57 | 36.6 | $R_3=-49.3$ | $T_2=2.42$ |
| Stop |   |   | $R_4=29.4$ | $S_2=3.12, 4.38$ |
| III | 1.49 | 57.4 | $R_5=89.2$ | $T_3=6.23$ |
|   |   |   | $R_6=-38.8$ |   |

EXAMPLE 4

Equivalent Focal Length=100 mm.   f/5.6

| Lens | $N_D$ | V | Radii (mm.) | Thicknesses and Spacings (mm.) |
|---|---|---|---|---|
| I | 1.49 | 57.4 | $R_1=28.0$ | $T_1=8.17$ |
|   |      |      | $R_2=-241$ | $S_1=6.41$ |
| II | 1.57 | 36.6 | $R_3=-51.4$ | $T_2=2.51$ |
| Stop |   |   | $R_4=29.1$ | $S_2=5.40, 4.51$ |
| III | 1.49 | 57.4 | $R_5=89.4$ | $T_3=5.67$ |
|   |   |   | $R_6=-40.9$ |   |

EXAMPLE 5
Equivalent Focal Length=100 mm.   f/5.6

| Lens | $N_D$ | V | Radii (mm.) | Thicknesses and Spacings (mm.) |
|---|---|---|---|---|
| I | 1.49 | 57.4 | $R_1=28.1$<br>$R_2=-241$ | $T_1=8.19$<br>$S_1=6.42$ |
| II | 1.57 | 36.6 | $R_3=-51.5$<br>$R_4=29.2$ | $T_2=2.51$<br>$S_2=5.41, 4.52$ |
| Stop | | | | |
| III | 1.57 | 57.4 | $R_5=109$<br>$R_6=-46.8$ | $T_3=5.67$ |

EXAMPLE 6
Equivalent Focal Length=100 mm.   f/6.3

| Lens | $N_D$ | V | Radii (mm.) | Thicknesses and Spacings (mm.) |
|---|---|---|---|---|
| I | 1.49 | 57.4 | $R_1=27.8$<br>$R_2=-264$ | $T_1=7.78$<br>$S_1=6.42$ |
| II | 1.57 | 36.6 | $R_3=-51.4$<br>$R_4=29.2$ | $T_2=2.50$<br>$S_2=5.11, 5.42$ |
| Stop | | | | |
| III | 1.61 | 58.8 | $R_5=111$<br>$R_6=-51.0$ | $T_3=5.66$ |

EXAMPLE 7
Equivalent Focal Length=100 mm.   f/6.3

| Lens | $N_D$ | V | Radii (mm.) | Thicknesses and Spacings (mm.) |
|---|---|---|---|---|
| I | 1.52 | 59.0 | $R_1=28.1$<br>$R_2=-302$ | $T_1=7.75$<br>$S_1=6.39$ |
| II | 1.62 | 36.6 | $R_3=-53.3$<br>$R_4=30.2$ | $T_2=2.49$<br>$S_2=5.09, 5.40$ |
| Stop | | | | |
| III | 1.62 | 58.6 | $R_5=108$<br>$R_6=-49.6$ | $T_3=5.64$ |

In the first six of the above examples, the front element is formed from methylmethacrylate with an index of refraction $N_D$ about 1.49 and an index of dispersion about 57.4 and the inner negative element is formed from a copolymer of acrylonitrile and styrene with an index of refraction and D about 1.57 and an index of dispersion V about 36.6. In Examples 1, 5 and 6, the rear positive element is glass. In Examples 2, 3 and 4, all elements are plastic. Example 7 describes a lens similar to the other six, in which all elements are formed from glass and which, therefore, would be somewhat more expensive to manufacture than the other examples.

Although the invention has been described in considerable detail with reference to certain preferred embodiments thereof, it will be understood that variations and modifications can be effected without departing from the spirit and scope of the invention as described hereinabove.

I claim:

1. A photographic objective of the simple triplet type having an equivalent focal length F and comprising two outer simple positive biconvex lens elements and an inner simple negative biconcave lens element, the three lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear.

| Lens | $N_D$ | V | Radii | Thicknesses and Spacings |
|---|---|---|---|---|
| I | 1.49 | 57.4 | $R_1=.287F$<br>$R_2=-1.99F$ | $T_1=.086F$<br>$S_1=.047F$ |
| II | 1.57 | 36.6 | $R_3=-.495F$<br>$R_4=.296F$ | $T_2=.024F$<br>$S_2=.081F$ |
| III | 1.57 | 57.4 | $R_5=1.11F$<br>$R_6=-.445F$ | $T_3=.057F$ |

2. A photographic objective of the simple triplet type having an equivalent focal length F and comprising two outer simple positive biconvex lens elements and an inner simple negative biconcave lens element, the three lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.49 | 57.5 | $R_1=.286F$<br>$R_2=-1.98F$ | $T_1=.086F$<br>$S_1=.046F$ |
| II | 1.57 | 36.6 | $R_3=-.494F$<br>$R_4=.295F$ | $T_2=.024F$<br>$S_2=.075F$ |
| III | 1.49 | 57.4 | $R_5=.894F$<br>$R_6=-.389F$ | $T_3=.062F$ |

3. A photographic objective of the simple triplet type having an equivalent focal length F and comprising two outer simple positive biconvex lens elements and an inner simple negative biconcave lens element, the three lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.49 | 57.4 | $R_1=.285F$<br>$R_2=-1.97F$ | $T_1=.094F$<br>$S_1=.042F$ |
| II | 1.57 | 36.6 | $R_3=-.493F$<br>$R_4=.294F$ | $T_2=.024F$<br>$S_2=.075F$ |
| III | 1.49 | 57.4 | $R_5=.892F$<br>$R_6=-.388F$ | $T_3=.062F$ |

4. A photographic objective of the simple triplet type having an equivalent focal length F and comprising two outer simple positive biconvex lens elements and an inner simple negative biconcave lens element, the three lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.49 | 57.4 | $R_1=.280F$<br>$R_2=-2.41F$ | $T_1=.082F$<br>$S_1=.064F$ |
| II | 1.57 | 36.6 | $R_3=-.514F$<br>$R_4=.291F$ | $T_2=.025F$<br>$S_2=.099F$ |
| III | 1.49 | 57.4 | $R_5=.894F$<br>$R_6=-.409F$ | $T_3=.057F$ |

5. A photographic objective of the simple triplet type having an equivalent focal length F and comprising two outer simple positive biconvex lens elements and an inner simple negative biconcave lens element, the three lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.49 | 57.4 | $R_1=.281F$<br>$R_2=-2.41F$ | $T_1=.082F$<br>$S_1=.064F$ |
| II | 1.57 | 36.6 | $R_3=-.515F$<br>$R_4=.292F$ | $T_2=.025F$<br>$S_2=.099F$ |
| III | 1.57 | 57.5 | $R_5=1.09F$<br>$R_6=-.468F$ | $T_3=.057F$ |

6. A photographic objective of the simple triplet type having an equivalent focal length F and comprising two outer simple positive biconvex lens elements and an inner simple negative biconcave lens element, the three lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.49 | 57.4 | $R_1=.278F$<br>$R_2=-2.64F$ | $T_1=.078F$<br>$S_1=.064F$ |
| II | 1.57 | 36.6 | $R_3=-.514F$<br>$R_4=.292F$ | $T_2=.025F$<br>$S_2=.105F$ |
| III | 1.61 | 58.8 | $R_5=1.11F$<br>$R_6=-.510F$ | $T_3=.057F$ |

7. A photographic objective of the simple triplet type having an equivalent focal length F and comprising two outer simple positive biconvex lens elements and an inner simple negative biconcave lens element, the three lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.52 | 59.0 | $R_1=.281F$<br>$R_2=-3.02F$ | $T_1=.078F$<br>$S_1=.064F$ |
| II | 1.62 | 36.6 | $R_3=-.533F$<br>$R_4=.302F$ | $T_2=.025F$<br>$S_2=.105F$ |
| III | 1.62 | 58.6 | $R_5=1.08F$<br>$R_6=-.496F$ | $T_3=.056F$ |

References Cited

UNITED STATES PATENTS 3,194,116   7/1965   Altman _____ 350—226

DAVID SCHONBERG, *Primary Examiner.*

R. J. STERN, *Assistant Examiner.*

U.S. Cl. X.R.

350—209